United States Patent
Hwang et al.

(10) Patent No.: US 7,348,124 B2
(45) Date of Patent: Mar. 25, 2008

(54) HIGH-DENSITY READABLE ONLY OPTICAL DISK

(75) Inventors: In-oh Hwang, Gyeonggi-do (KR); In-sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 10/671,865

(22) Filed: Sep. 29, 2003

(65) Prior Publication Data

US 2004/0161575 A1 Aug. 19, 2004

(30) Foreign Application Priority Data

Sep. 28, 2002 (KR) .................. 10-2002-0059139
Jul. 18, 2003 (KR) .................. 10-2003-0049132

(51) Int. Cl.
*G11B 7/24* (2006.01)

(52) U.S. Cl. ............ 430/270.12; 430/945; 428/64.4; 369/284; 369/286

(58) Field of Classification Search .............. None
See application file for complete search history.

(56) References Cited

U.S. PATENT DOCUMENTS

| | | | |
|---|---|---|---|
| 5,569,517 A | 10/1996 | Tominaga et al. | |
| 6,411,591 B1 | 6/2002 | Moritani et al. | |
| 7,087,284 B2 * | 8/2006 | Kim et al. | 428/64.1 |
| 2001/0030938 A1 * | 10/2001 | Oumi et al. | 369/300 |
| 2004/0219455 A1 * | 11/2004 | Tseng et al. | 430/270.11 |
| 2005/0009260 A1 * | 1/2005 | Kim et al. | 438/202 |
| 2005/0079313 A1 * | 4/2005 | Kim et al. | 428/64.4 |
| 2005/0106351 A1 * | 5/2005 | Hwang et al. | 428/64.4 |

FOREIGN PATENT DOCUMENTS

| | | | |
|---|---|---|---|
| EP | 1067534 A2 | | 1/2001 |
| JP | 61-202651 | * | 3/1988 |
| JP | 363-244424 | * | 10/1988 |
| JP | 03-160634 | * | 7/1991 |
| JP | 06-044609 | | 2/1994 |
| JP | 06-295471 | * | 10/1994 |
| JP | 07-098484 | * | 4/1995 |
| JP | 07-287870 | * | 10/1995 |
| JP | 10-106027 | * | 4/1998 |
| JP | 411-096597 | * | 4/1999 |

(Continued)

OTHER PUBLICATIONS

Nomura et al., "Super-resolution read only memory disk with metal nanoparticles or small aperture", Jap. J. Appl. Phys. Pt 1, vol. 41(3B) pp. 1876-1879 (Mar. 2002).*

(Continued)

*Primary Examiner*—Martin Angebranndt
(74) *Attorney, Agent, or Firm*—Stein, McEwen & Bui, LLP

(57) ABSTRACT

A high-density readable only optical disk with a large storage capacity includes a substrate with pits, and one or more mask layers with a super resolution near field structure, which are made of a mixture of a dielectric material and metal particles. The optical disk can be obtained without decreasing the wavelength of a laser diode or increasing the numerical aperture of an objective lens.

15 Claims, 2 Drawing Sheets

FOREIGN PATENT DOCUMENTS

JP    11-213447    *  8/1999
JP    2002-133720  *  5/2002

OTHER PUBLICATIONS

Kikukawa et al., "Rigid bubble pit formation . . . " Appl. Phys. Lett. vol. 81(25) pp. 4697-4699 (Dec. 2002).*

Tominaga et al., "The characteristics and the potantial of super . . . ", Jpn. J. Apl. Phys., Pt 1, vol. 39(2B) pp. 957-961 (Feb. 2000).*

Machine translation of JP 06-044609.*

Office Action issued in Japanese Patent Application No. 2003-336174 on Jun. 13, 2006, in Japanese.

* cited by examiner

HIGH-DENSITY READABLE ONLY OPTICAL DISK

CROSS-REFERENCE TO RELATED APPLICATIONS

This application claims the benefit of Korean Patent Application No. 2002-59139, filed on Sep. 28, 2002 in the Korean Intellectual Property Office, and Korean Patent Application No. 2003-49132, filed on Jul. 18, 2003 in the Korean Intellectual Property Office, the disclosures of which are incorporated herein in their entirety by reference.

BACKGROUND OF THE INVENTION

1. Field of the Invention

The present invention relates to an optical disk, and more particularly, to a high-density readable only optical disk with a super resolution near field structure, which can read marks with a size smaller than the resolution of a laser beam.

2. Description of the Related Art

Because optical disks have a very small recording area per recording unit in comparison with existing magnetic recording media, optical disks have been widely used as high-density recording media. According to their characteristics, optical disks are classified into a Read Only Memory (ROM) type, a Write Once Read Many (WORM) type, and an erasable type. The ROM type of optical disks can only read pre-recorded data, the WORM type of optical disks allows a user to write data onto a disk only once, and the erasable type of optical disks allows a user to erase and re-record data.

One example of the WORM optical disks is a Compact Disk Recordable (CD-R) disk. In a CD-R disk, when a recording laser beam with a wavelength of 780 nm is focused on a recording layer made from an organic dye material such as cyanine and phthalocyanine, bonds in the organic dye material are broken. At the same time, the structures of a substrate and a reflecting layer are optically changed. Under this process, data are recorded on a CD-R disk. The recorded data are read with a low power of 1 mW or less. A CD-R disk has a storage capacity of about 650 MB, and thus is widely used for recording and reading various types of data, such as audio and video data.

However, the storage capacity of optical recording media such, as CD-R or CD-Rewritable (CD-RW), which require a recording wavelength of 780 nm that is insufficient to record dynamic image data. Therefore, such optical recording media with a small storage capacity are impractical in today's complex multimedia environment.

In order to solve this problem, Digital Versatile Disks (DVDs), which require a shorter laser wavelength of 630-680 nm have been developed. DVDs have a storage capacity of between 2.7 and 4.7 GB (on one side). Generally, DVDs can be classified into a DVD-read only memory (DVD-ROM) type, a DVD-recordable (DVD-R) type, a DVD-random access memory (DVD-RAM) type, and a DVD-rewritable (DVD-RW) type. Recording on the DVD-R disks is accomplished through the use of a recording layer in which bonds in an organic dye material are broken upon exposure to a recording laser beam. As for the DVD-RAM and the DVD-RW disks, a recording layer's phase change alters the optical characteristics of disks, and thus, data are recorded on or erased from disks. In particular, the DVD-R disks using an organic dye material are compatible with DVD-ROM, cost effective, and have a large storage capacity in comparison with other recording media. For these reasons, much attention has been paid to the DVD-R disks at present.

As can be seen from the above description, one of the most important issues in many of the optical media is to increase the storage capacity. In this regard, various attempts have been made to increase the storage capacity. The storage capacity of optical disks mainly depends on the number of tiny pits on a predetermined surface of optical disks and the characteristics of a laser beam used to correctly read the pits. Generally, light output from a laser diode spreads in the form of a beam with a definite width due to diffraction in spite of using an optical pickup's objective lens. This beam size is called "diffraction limit."

General optical disks have a reading resolution limit, given by the expression: $\lambda/4NA$, where $\lambda$ is the wavelength of a light source and NA is the numerical aperture of an objective lens. As can be seen from the above expression, the storage capacity of optical disks can be increased by shortening a light source's wavelength or using an objective lens with a larger NA. However, there are limitations in that recent laser technologies cannot provide such a shorter wavelength laser and an objective lens with lager NA is expensive. Furthermore, as the NA of an objective lens increases, a distance (working distance) between a pickup and a disk is remarkably shortened. Thus, the pickup and the disk might collide with each other. As a result, damage to the surface of the disk may be caused, resulting in data loss.

In order to overcome the reading resolution limit, optical disks having a super resolution near field structure (super-RENS) have been studied. In optical disks having such a super-RENS, a mask layer made of silver oxide is mainly used. FIG. 1 schematically shows an optical disk with a silver oxide mask layer. As shown in FIG. 1, the optical disk includes a transparent substrate 10, dielectric layers 14, mask layers 11, a recording layer 12 having marks 15, and a reflective layer 13.

In optical disks with the structure of FIG. 1, silver oxide is dissociated into silver particles and oxygen for data recording. On the other hand, for data reading, plasmons are formed on the surfaces of the silver particles. Such surface plasmons induce near field reading (NFR). Therefore, very small marks 15 beyond the diffraction limit can be read.

A mask layer 11 made of metal oxide such as silver oxide can be used in WORM optical recording media in which silver oxide is dissociated into silver particles and oxygen for data recording. This means that metal particles inducing a super resolution effect are generated during a recording process. For this reason, there is a problem in that a silver oxide mask layer cannot be used in ROM optical disks that store data in the form of pits on their substrates instead of a recording process.

SUMMARY OF THE INVENTION

The present invention provides a high-density read only optical disk with a large storage capacity. The optical disk can be obtained without decreasing the wavelength of a laser diode or increasing the numerical aperture of an objective lens.

Additional aspects and/or advantages of the invention will be set forth in part in the description which follows and, in part, will be obvious from the description, or may be learned by practice of the invention.

According to an aspect of the present invention, a high-density read only optical disk includes a substrate with pits and one or more mask layers with a super resolution near field structure, which are made of a mixture of a dielectric material and metal particles.

According to an aspect of the invention, the dielectric material is a metal oxide, nitride, sulfide, fluoride, or a mixture thereof.

According to an aspect of the invention, the dielectric material is $ZnS-SiO_2$.

According to an aspect of the invention, the metal particles are derived from gold, platinum, rhodium, palladium, or a mixture thereof.

According to an aspect of the invention, the metal particles are platinum particles.

According to an aspect of the invention, the optical disk further comprises one or more reflective layers.

According to an aspect of the invention, the optical disk may further comprise dielectric layers on the upper and lower surfaces of the mask layer.

BRIEF DESCRIPTION OF THE DRAWINGS

These and/or other features and advantages of the invention will become apparent and more readily appreciated by describing in detail exemplary embodiments thereof with reference to the accompanying drawings in which.

DETAILED DESCRIPTION OF THE EMBODIMENTS

Figure 1:
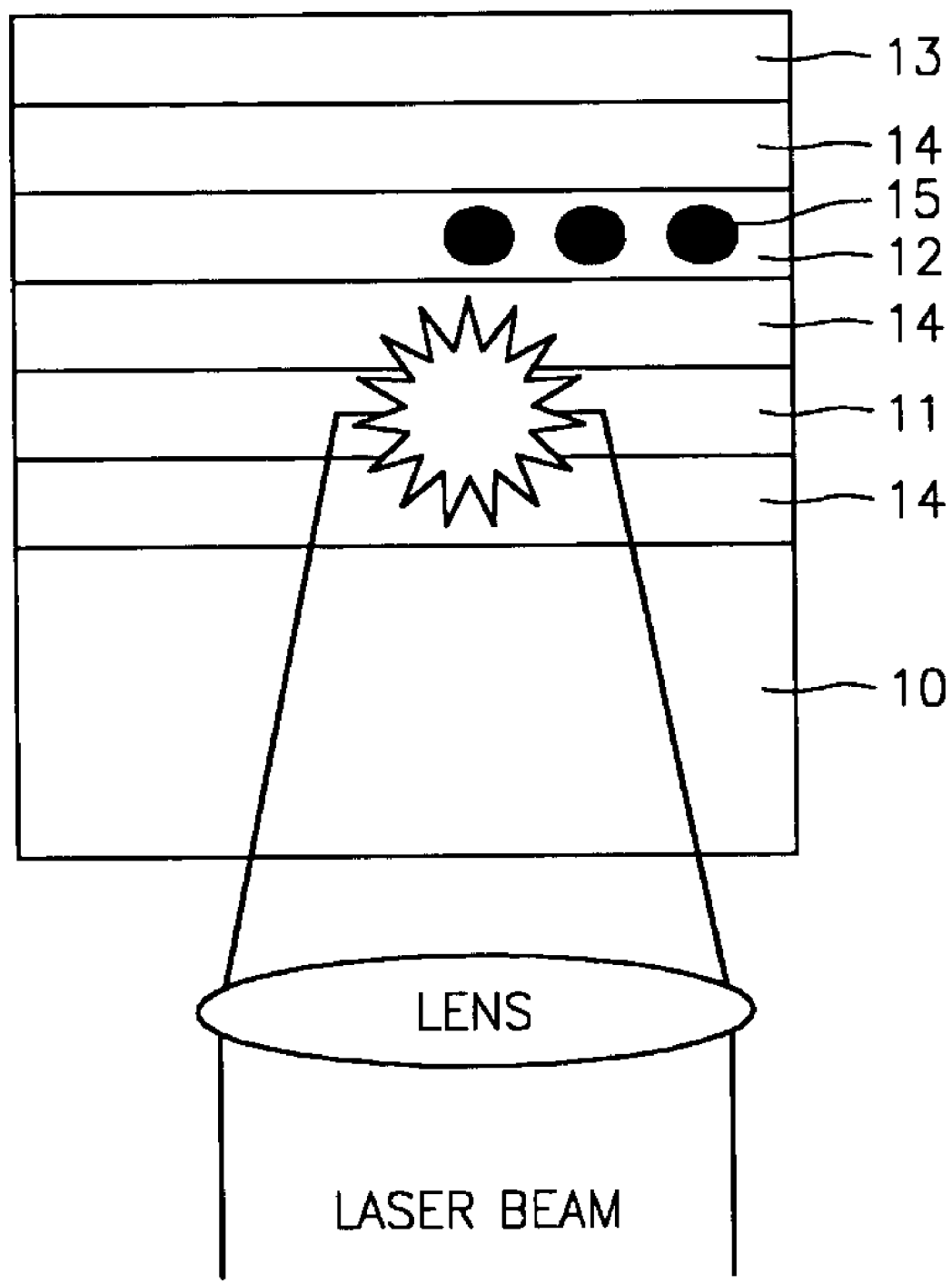
FIG. 1 is a schematic view of an optical disk with a conventional structure.

Reference will now be made in detail to the embodiments of the present invention, examples of which are illustrated in the accompanying drawings, wherein like reference numerals refer to the like elements throughout. Hereinafter, the present invention will be described in more detail with reference to the accompanying drawings.

Figure 2:
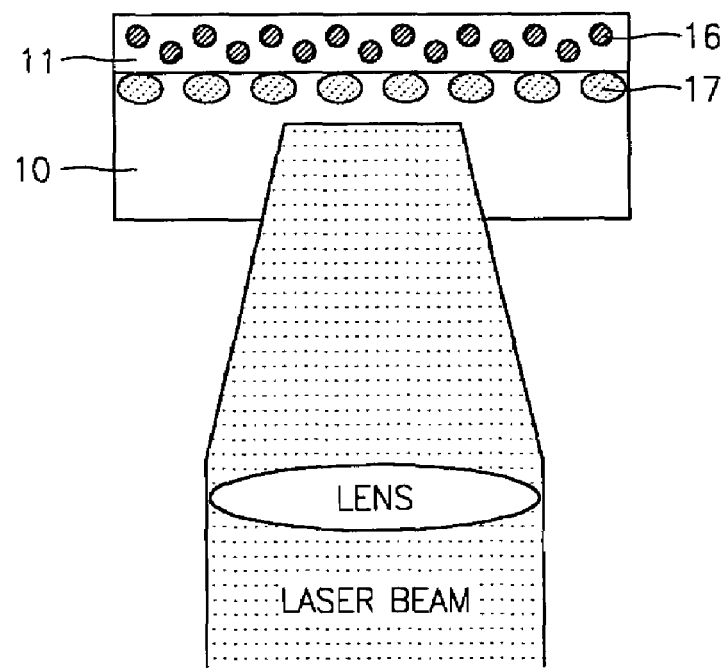
FIG. 2 is a schematic view of an optical disk according to an embodiment of the present invention.

FIG. 2 shows an optical disk according to an embodiment of the present invention. An optical disk of FIG. 2 comprises a transparent substrate 10 with pits 17. A mask layer 11 is formed on the substrate 10. The substrate 10 is very transparent to a wavelength of a reproducing laser. The substrate 10 is formed by a conventional substrate fabrication method, such as injection molding using a material with excellent impact resistance, heat resistance, and weatherability. Examples of the substrate material include polycarbonate, polymethylmethacrylate, epoxy, polyester, and amorphous polyolefin.

The mask layer 11 of the present invention is formed using fine metal particles 16 dispersed in a dielectric material instead of using a conventional silver oxide. The size of the fine metal particles 16 is smaller than a wavelength of a laser beam. The mask layer 11 acts as an aperture for near field light due to self-focusing effect. Therefore, fine marks 16 with a size of, for example, 100 nm or less, can be read using a laser with a wavelength of, for example, 680 nm. According to the present invention, since the fine metal particles 16 are used as a source of a surface plasmon, they are suitable for read only disks.

According to an aspect of the invention, the dielectric material to be used in the masking layer 11 is metal oxide, nitride, sulfide, fluoride, or a mixture thereof. For example, $SiO_2$, $Al_2O_3$, $Si_3N_4$, SiN, ZnS, or $MgF_2$ can be used. While not required in all aspects, the metal particles 16 to be dispersed in the masking layer 11 are derived from a noble metal such as gold, platinum, rhodium, and palladium. In this case, because the dielectric material and the metal particles 16 are not chemically reactive with each other, the original shape of the fine metal particles 16 can be maintained. However, while possible, the use of silver particles is not preferable where sulfur is in the dielectric material. This is because the silver particles react with sulfur of the dielectric material, thereby deteriorating the characteristics of the mask layer 11.

Meanwhile, the mask layer 11 may be deposited by a sputtering process according to an aspect of the invention. The target of the sputtering process is a mixture of the dielectric material and the fine metal particles. Therefore, the fine metal particles 16 with a size smaller than a wavelength of the laser beam can be dispersed in the dielectric material using the sputtering process.

Although not shown in FIG. 2, an embodiment of the optical disk of the present invention further includes one or more reflective layers 13 shown in FIG. 1. The reflective layer 13 is used to secure high reflectivity when data are recorded or read. In this regard, it is preferable to use a metal with high heat conductivity and reflectivity as the material for the reflective layer. The reflective layer may be made of one selected from the group consisting of Au, Al, Cu, Cr, Ag, Ti, Pd, Ni, Zn, Mg, and an alloy thereof. The reflective layer is formed to a thickness of 50 to 150 nm by means of a conventional method such as vacuum deposition, e-beam, and sputtering. It is preferable, but not required, to limit the thickness of the reflective layer to a range of 60 to 120 nm to secure a sufficient reflectivity and reliability.

According to an embodiment of the invention, the optical disk of the present invention may further comprise a dielectric layer 14 shown in FIG. 1, between the mask layer 11 and the substrate 10, between the mask layer 11 and the reflective layer 13, or on the upper and the lower surfaces of the mask layer 11. A dielectric layer 14 between the mask layer 11 and the substrate 10 acts to prevent thermal damage to the substrate 10. On the other hand, a dielectric layer 14 between the mask layer 11 and the reflective layer 13 acts as a diffusion prevention layer.

An optical disk of an embodiment of the present invention may further comprise a protective layer (not shown). The protective layer acts to protect other layers, in particular, the reflective layer. The protective layer can be formed using a conventional method such as spin coating. In detail, an epoxy- or acrylate-based ultraviolet light curable resin, a transparent material that exhibits a high impact strength and is curable using an ultraviolet light, is spin coated on the reflective layer, followed by ultraviolet light curing to thereby form the protective layer.

Hereinafter, the present invention will be described in more detail by way of examples. However, it is understood that the present invention is not limited thereto.

EXAMPLE 1

A polycarbonate (PC) substrate with a thickness of 0.6 mm was prepared. The substrate had pits and a track pitch of 0.74 μm, which is the same as that of digital versatile disk (DVD). A $ZnS-SiO_2$ target and Pt target were co-deposited on the substrate by sputtering at 400 W and 160 W, respectively, to form a mixed thin film. At this time, an Ar gas was supplied at a rate of 20 sccm, a deposition pressure was 1.5 mTorr, and the volume ratio of $ZnS-SiO_2$ to Pt in the thin film was 80 to 20.

EXAMPLE 2

A polycarbonate (PC) substrate with a thickness of 0.6 mm was prepared. The substrate had pits and a track pitch of 0.74 μm. A $ZnS-SiO_2$ dielectric layer and a $ZnS-SiO_2$+Pt mask layer were deposited on the substrate by sputtering. Then, an Ag reflective layer was deposited to a thickness of 100 nm by sputtering. A light curable resin based protective layer was spin coated on the reflective layer. The resultant structure was then dried in a vacuum oven at 40° C. for 12 hours to prepare an optical disk. In this case, the ZnS-SiO$_2$+Pt mask layer was formed in the form of a mixed thin film with a thickness of 50 nm by co-sputtering a ZnS-SiO$_2$ target and a Pt target at 400 W and 160 W, respectively. An Ar gas was supplied at a rate of 20 sccm, a deposition pressure was 1.5 mTorr, and the volume ratio of ZnS-SiO$_2$ to Pt in the thin film was 80 to 20.

EXAMPLE 3

A readable only disk was prepared in the same manner as in Example 2 except that a ZnS-SiO$_2$ layer was further formed between the mask layer and the reflective layer.

COMPARATIVE EXAMPLE 1

A polycarbonate (PC) substrate with a thickness of 0.6 mm was prepared. The substrate had pits and pre-grooves with a track pitch of 0.74 µm. An Ag reflective layer was deposited on the substrate by sputtering. Then, a light curable resin based protective layer was spin coated on the reflective layer. As a result, a readable only optical disk without a mask layer was formed.

EXPERIMENT EXAMPLE 1

Figure 3:
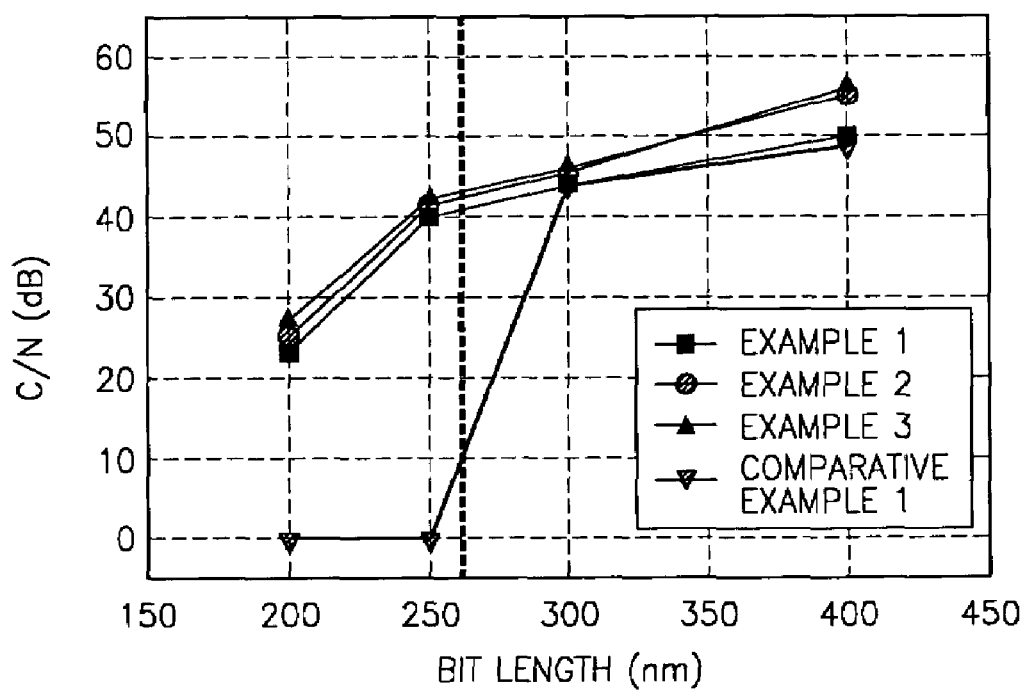
FIG. 3 is a graph showing the results of performance evaluation for the optical disks prepared in Examples 1-3 and Comparative Example 1.

Performances of the disks of Examples 1-3 and Comparative Example 1 were evaluated using evaluation equipment for a DVD with a beam wavelength of 635 nm and a pickup with a numerical aperture of 0.60. For this, a carrier to noise ratio (C/N) value was measured at a linear velocity of 6 m/s and a reading power of 4 mW and the result is shown in FIG. 3. As shown in FIG. 3, a reading resolution limit (λ/4NA) was 265 nm and the minimum pit length of the DVD was 400 nm. In the optical disk of Comparative Example 1, no C/N values were obtained in 250 and 200 nm pits, which are smaller than the reading resolution limit (265 nm). However, in the optical disk of Example 1, a C/N value of about 40 dB, which is of a practical level, was obtained in a 250 nm pit. This experiment result demonstrates that a super resolution effect can be obtained in an optical disk of the present invention.

As is apparent from the above description, the present invention provides a high-density read only optical disk with large storage capacity. The optical disk can be obtained without decreasing the wavelength of a laser diode or increasing the numerical aperture of an objective lens. Moreover, while described in terms of a read only disk, it is conceivable that the invention could be used with recordable optical disks.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A high-density readable only optical disk, comprising:
   a substrate with pits; and
   at least one mask layer with a super resolution near field structure, the at least one mask layer comprising a mixture of a dielectric material and metal particles, wherein one or more of the metal particles are derived from rhodium, or an alloy thereof.

2. The optical disk according to claim 1, wherein the dielectric material comprises one of metal oxide, nitride, sulfide, fluoride, and a mixture thereof.

3. The optical disk according to claim 1, wherein the dielectric material is ZnS—SiO$_2$.

4. The optical disk according to claim 1, wherein the one or more metal particles further includes gold, platinum, palladium, or an alloy thereof.

5. The optical disk according to claim 1, further comprising one or more reflective layers disposed adjacent one of the substrate and the at least one mask layer.

6. The optical disk according to claim 1, further comprising dielectric layers on the upper and the lower surfaces of the mask layer.

7. The optical disk according to claim 1, further including one or more metal particles of gold, platinum, palladium, or an alloy thereof.

8. A high-density readable only optical disk, comprising:
   a substrate with pits; and
   at least one mask layer with a super resolution near field structure, the at least one mask layer comprising a mixture of a dielectric material and metal particles, wherein the metal particles are derived from one of rhodium and an alloy of rhodium and gold, platinum, and palladium.

9. The optical disk according to claim 8, wherein the dielectric material comprises one of metal oxide, nitride, sulfide, fluoride, and a mixture thereof.

10. The optical disk according to claim 8, wherein the dielectric material is ZnS—SiO$_2$.

11. The optical disk according to claim 8, further comprising one or more reflective layers disposed adjacent one of the substrate and the at least one mask layer.

12. The optical disk according to claim 8, further comprising dielectric layers on the upper and the lower surfaces of the mask layer.

13. A high-density readable only optical disk, comprising:
    a substrate with pits; and
    at least one mask layer with a super resolution near field structure, the at least one mask layer where a ZnS—SiO$_2$ target and one or more metal targets were co-deposited on the substrate by sputtering to form a mixed thin film, wherein at least one of the metal targets contains rhodium.

14. A high-density readable only optical disk of claim 13, wherein at least one of the metal targets contains at least one of gold, platinum, and palladium.

15. A high-density readable only optical disk, comprising:
    a substrate with pits; and
    at least one mask layer with a super resolution near field structure, the at least one mask layer comprising a mixture of a dielectric material and rhodium metal particles, wherein the dielectric material comprises one of metal oxide, nitride, sulfide, fluoride, and a mixture thereof.

* * * * *